US006845127B2

(12) United States Patent
Koh

(10) Patent No.: US 6,845,127 B2
(45) Date of Patent: Jan. 18, 2005

(54) REAL TIME REMOTE MONITORING SYSTEM AND METHOD USING ADSL MODEM IN REVERSE DIRECTION

(75) Inventor: Jong-Seog Koh, Seoul (KR)

(73) Assignee: Korea Telecom (KR)

( * ) Notice: Subject to any disclaimer, the term of this patent is extended or adjusted under 35 U.S.C. 154(b) by 717 days.

(21) Appl. No.: 09/752,669

(22) Filed: Dec. 28, 2000

(65) Prior Publication Data

US 2001/0017910 A1 Aug. 30, 2001

(30) Foreign Application Priority Data

Feb. 12, 2000 (KR) .......................................... 2000-6693
Nov. 22, 2000 (KR) .......................................... 2000-69415

(51) Int. Cl.[7] .................................................. H04B 1/38

(52) U.S. Cl. .................. 375/222; 375/240.01; 382/107; 382/236; 348/155; 725/126

(58) Field of Search ................................ 375/219, 222, 375/240.01, 240.15, 240.16, 240.23, 240.25, 377; 382/107, 236; 348/151, 154, 155, 198.1, 402.1, 423.1, 552; 725/111, 126

(56) References Cited

U.S. PATENT DOCUMENTS 6,108,034 A * 8/2000 Kim ........................... 348/154
6,181,693 B1 * 1/2001 Maresca ..................... 370/352
6,631,418 B1 * 10/2003 Watkins ...................... 709/231

* cited by examiner

*Primary Examiner*—Young T. Tse
(74) *Attorney, Agent, or Firm*—Blakely Sokoloff Taylor & Zafman

(57) ABSTRACT

Disclosed are a real time remote monitoring system and a method therefore using an ADSL in a reverse direction. The real time remote monitoring system performs a remote monitoring in real time by compression-encoding a plurality of monitored image data or audio data in a bit stream, generating a motion detection signal for each image data, and by compressing/transmitting video or video/audio data with an ADSL modem installed in a reverse direction.

12 Claims, 8 Drawing Sheets

REAL TIME REMOTE MONITORING SYSTEM AND METHOD USING ADSL MODEM IN REVERSE DIRECTION

FIELD OF THE INVENTION

The present invention relates to a remote, monitoring system and a method thereof, and in particular, to a real time remote monitoring, system and a method therefore, which can perform a real time monitoring by compressing/transmitting video/audio data in reverse direction with an asynchronous digital subscriber line (ADSL) modem rather than a dedicated line.

DESCRIPTION OF THE PRIOR ART

One of the conventional remote monitoring methods is that a monitoring camera is used to photograph monitored image data, which are stored in a private storing device of a corresponding region and analyzed when accidents occur. However, this method has a low utility because of its inability to monitor a remote object in real time.

Another conventional remote monitoring method is using an integrated services digital network (ISDN). However, the ISDN has a low capacity in transmitting a large amount of data in a high velocity and in real time such as transmitting monitored image data. Accordingly, another method used instead is a method of compressing the monitored image data by using an MJPEG or an H.261 manner.

However, the conventional remote monitoring methods described above pose a problem of deteriorating the quality of image because the amount of monitored image data is far greater than the transmissible capacity of the ISDN despite the transmission of data through compression using the MJPEG or H.261 manner.

Another available conventional remote monitoring method is a method using dedicated line having a larger transmissible capacity than the ISDN. Here, the monitored image data are compressed by using the MJPEG or H.261 manner before transmission.

However, using a dedicated line also poses problems of incurring a great amount of royalty and having a low utility due to installation of a new line in each monitoring area.

Meanwhile, each of the above conventional methods encounters a problem that the amount of data increases due to storage or transmission of monitored image data regardless of an existence of user when monitoring an automated teller machine (ATM). Accordingly, the conventional methods have drawbacks of requiring a storing device of a large capacity to elongate the recording time in the storing device as long as necessary. Further, the conventional methods use only a single camera orienting a front direction in consideration of the amount of monitored image data, thereby being unable to trace and identify the users who illegally approach and manipulate the ATM by wearing mats or caps.

SUMMARY OF THE INVENTION

It is, therefore, an object of the present invention to provide a real time remote monitoring system and a method thereof, which can perform a remote monitoring in real time by compressing/transmitting video/audio data with an ADSL in a reverse direction.

To be specific, an object of the present invention is to provide a remote monitoring system and a method therefore, which can perform a remote monitoring in real time by compression-encoding a plurality of monitored image data or monitored audio data in a bit stream, generating operation detection signals for each of the image data, and by compressing/transmitting video/audio data with an ADSL in a reverse direction.

To achieve the above object, in accordance with an aspect of the present invention there is provided a real time remote monitoring system using an ADSL modem in reverse direction, comprising: monitoring means for monitoring an object facility to be monitored; remotely monitored data processing means for monitoring motions accordingly to each channel with respect to the monitored data obtained by the monitoring means so as to be compression-encoded and transmitted in a bit stream, and generating detection signals with respect to the monitored data that have been detected; first ADSL modulating/demodulating means installed in a reverse direction for. modulating the data inputted from the remotely monitored data processing means so as to be upwardly transmitted to a network in a transmission velocity higher than that of the downward channel, and demodulating the data transferred from the network in a transmission velocity lower than that of the upward channel so as to be transferred to the remotely monitored data processing means; second ADSL modulating/demodulating means installed in a reverse direction for demodulating the data transferred from the first ADSL modulating/demodulating means in a transmission velocity higher than that of the downward channel so as to be transferred to a receiving party, and modulating the data transferred from the receiving party so as to downwardly transferred to the first ADSL modulating/demodulating means in a transmission velocity lower than that of the upward channel To achieve the above object, in accordance with another aspect of the present invention, there is also provided a method for real time remote monitoring using an ADSL modem in a reverse direction, including the steps of: a) obtaining monitored data by monitoring an object facility to be monitored; b) detecting motions according to each channel with respect to the monitored data that have been obtained, compression-encoding the monitored data in a bit stream so as to be transmitted, and generating detection signals with respect to each of the monitored data that has been detected; and c) modulating the monitored data and the detection signals by using an ADSL modem installed in a reverse direction in a transmission velocity higher than that of the downward channel so as to be transmitted to a network, and demodulating the data transferred from the network in a transmission velocity lower than that of the upward channel so as to perform a remote monitoring.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1A:
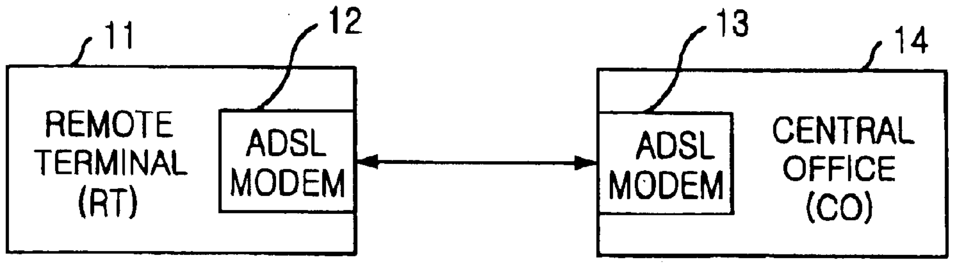
FIG. 1A (PRIOR ART)
FIGS. 1A and 1B are diagrams showing a conventional manner of installing an ADSL modem.
Figure 1B:
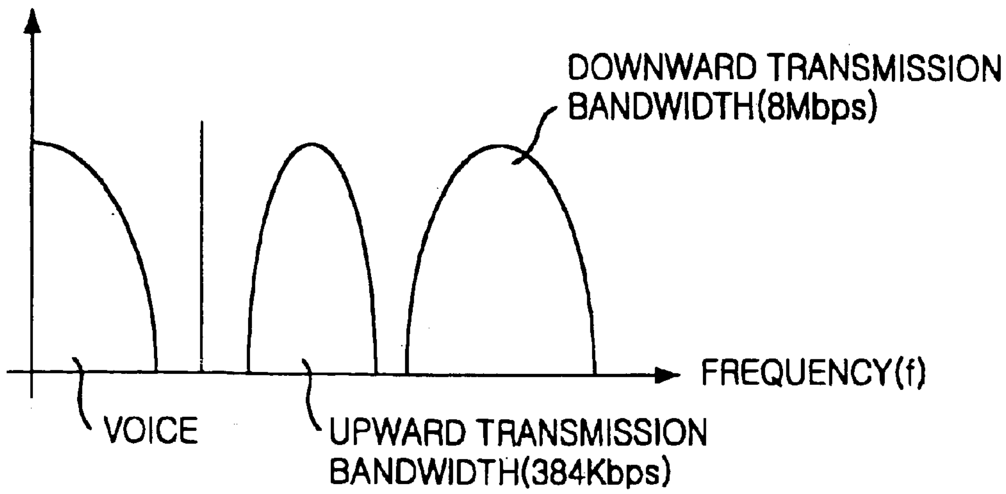
FIG. 1B (PRIOR ART)

A preferred embodiment of the present invention will be described herein below with reference to the accompanying drawings. In the following description, well-known functions or constructions are not described in detail since they would obscure the invention in unnecessary detail. FIGS. 1A and 1B are diagram showing a conventional manner of installing an ADSL modem.

FIGS. 1A and 1B show that, under the conventional art, an ADSL modem 12 mounted at a remote terminal 11, which is installed at an object facility to be monitored, and an ADSL modem 13 installed at a central office 14 have maximum transmission velocities in an upward transmission bandwidth and a downward transmission bandwidth or 384 Kbps and 8 Mbps, respectively, when assuming the transmitting direction from the remote terminal 11 to the central office 14 as an upward direction, and the reverse direction as a downward direction.

Therefore, the conventional technology of the ADSL is very effectively used for the services having a little amount of data in the upward transmission bandwidth and a large amount of data in the downward transmission bandwidth. However, it is not actually used for the services having a large amount of data in the upward transmission bandwidth and a little amount of data in the downward transmission bandwidth.

Figure 2A:
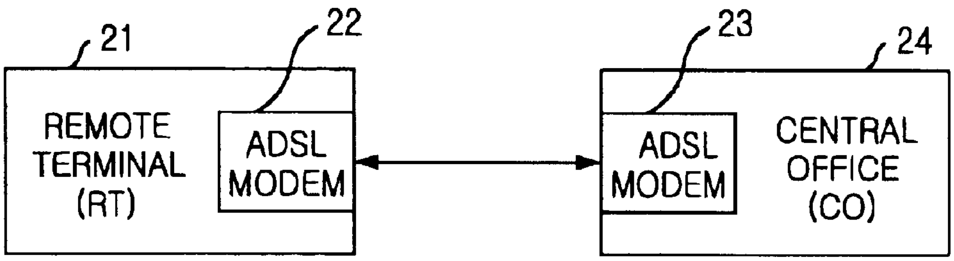
FIGS. 2A and 2B are diagrams showing a manner of installing an ADSL modem according to an embodiment of the present invention.
Figure 2B:
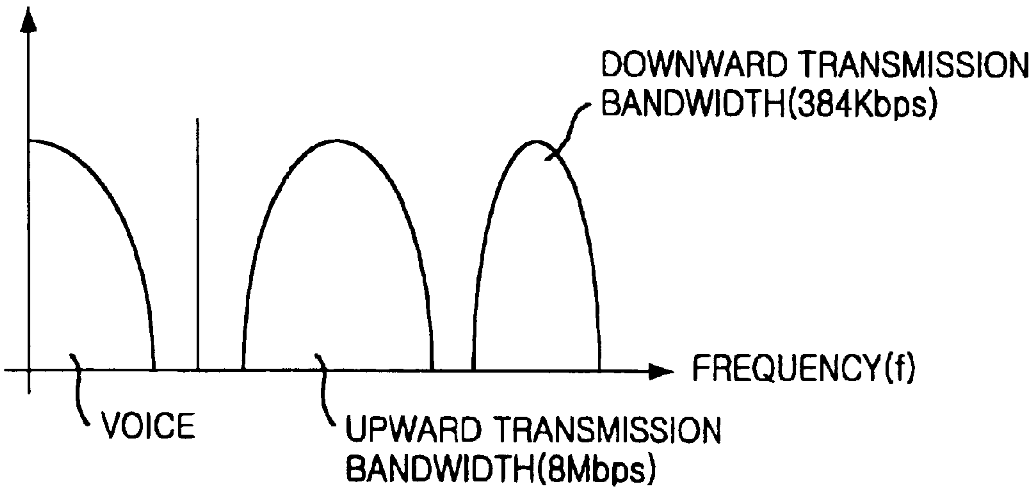

FIGS. 2A and 2B are diagrams showing a manner of installing an ADSL modem according to an embodiment of the present invention.

Referring to FIGS. 2A and 2B, an ADSL modem 22 mounted at a remote terminal 21, which is installed at an object facility to be monitored, and an ADSL modem 23 installed at a central office 24 have maximum transmission velocities in an upward transmission bandwidth and a downward transmission bandwidth of 8 Mbps and 384 Kbps, respectively, when assuming the transmitting direction from the remote terminal 21 to the central office 24 as an upward direction, and the reverse direction as a downward direction.

This means that, the present invention is to utilize the ADSL technology for the services having a large amount of data in the upward transmission bandwidth and a little amount of data in the downward transmission bandwidth by installing the ADSL in a direction reverse to the conventional method, i.e., exchanging the upward/downward transmission bandwidth of the ADSL used under the conventional method.

Figure 3:
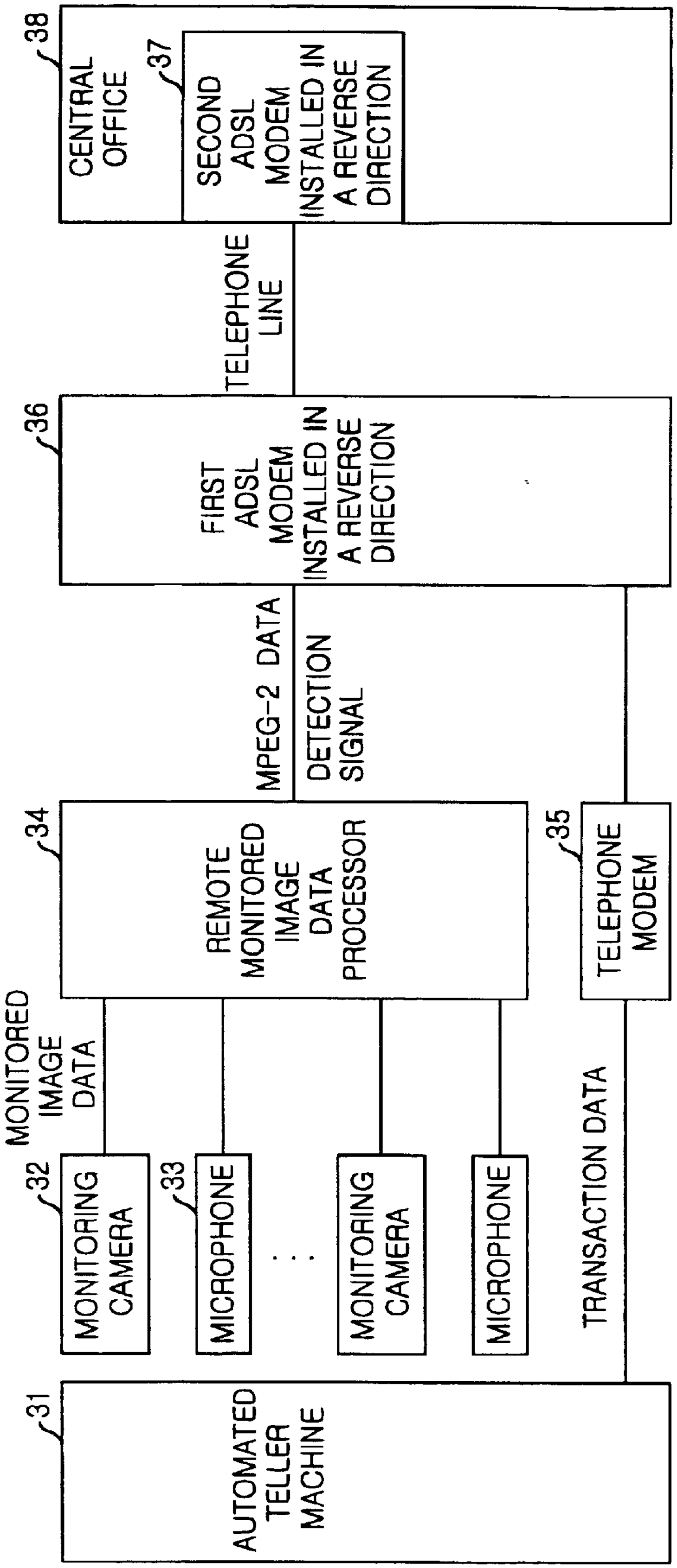
FIG. 3 is a block diagram showing a construction of a real time remote monitoring system using an ADSL model in a reverse direction according to the present invention.

FIG. 3, is a block diagram showing a construction of a real time remote monitoring system using an ADSL model in a reverse direction according to the present invention.

Referring to FIG. 3, the remote monitoring system according to the present invention includes: an ATM 31, which is an object to be monitored; a plurality of monitoring cameras 32 installed for remotely photographing illegal users (the users of a bad faith) of the ATM 31 at a front direction, side directions, a bottom direction or from a far to effectively monitor the illegal users approaching to the ATM 31 by wearing hats or caps on a deep level or in bending locations; a microphone 33 installed either in each of the plurality of monitoring cameras 32 or on a separate basis for obtaining voices or sounds; a remotely monitored image data processor 33 for detecting motions in the plurality of monitored image data photographed by the plurality of monitoring cameras 32 according to each channel to compression-encode and transmit the monitored audio data together with the monitored video data either by compression encoding the monitored image data in an MPEG-2 bit stream or by detecting an existence of the monitored audio data obtained by the plurality of microphone 33 on an individual basis, and generating detection signals with respect to each of the monitored data that has been detected; a telephone modem 35 for modulating/demodulating transaction data transmitted/received between the ATM 31 and a bank where the ATM 31 is installed; a first ADSL modem 36 installed in a reverse direction for modulating and upwardly transmitting the data inputted from the remotely monitored image data processor 34 and the telephone modem 35 in a velocity of 8 Mbps at the maximum, and demodulating and transferring the data transferred from a second ADSL modem 37 in a velocity of 384 Kbps at the maximum to the remotely monitored image data processor 34 and the telephone modem 35; and the second ADSL modem 37 installed in a reverse direction for demodulating the data transferred from the fist ADSL modem 36 through a telephone line in a velocity of 8 Mbps at the maximum so as to be transferred to a receiving party, and modulating and downwardly transmitting the data transferred from the receiving party in a velocity of 384 Kbps at the maximum to the first ADSL modem 36.

Here, the microphone 33 and the pertinent monitored audio data processing step are additional elements employed in the present invention but are unnecessary when the object facility to be monitored is installed in a noisy area.

The telephone modem 35 is also an additional element in the present invention that becomes unnecessary when the object facility to be monitored is not the ATM but an external wall.

The present invention is variably applicable not only to monitoring the ATM mentioned above but also to monitoring inside of a building including companies and plants, in heavy traffic areas; disaster areas such as bridges, dams or rivers, garbage collection areas, as well to monitoring outside of buildings such as parking lots.

Four or more monitoring cameras 32 may be installed. Three of the four monitoring channels may be used as monitoring channels, while the remaining one channel may be used as an Internet line.

Also, when monitoring camera 32 are distant from the remotely monitored image data processor 34, the monitored image data photographed by the monitoring cameras 32 may be multiplexed and transferred to the remotely monitored image data processor 34.

The downward channel (the channel directed from the central office to the ATM channel) may be used for controlling the monitoring camera 32 or for warning the illegal users under the control from a monitoring person by additionally installing an output device such as a speaker (not shown in the drawing). It is also possible to use the existing telephone modem 35 as a telephone for emergency calls while allowing the data transmitted/received through the upward/downward channels to be inputted/outputted to or from the ATM 31 so as to perform the function of the existing telephone modem 35.

An operation of the method according to the present invention will be omitted herein as it is identical to the operation described with reference to FIG. 3.

Figure 4:
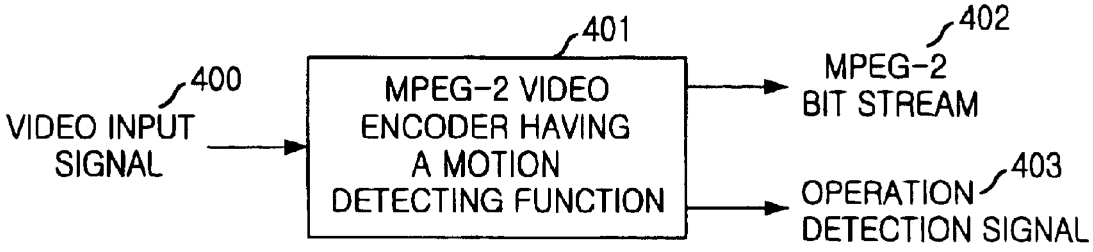
FIG. 4 is a diagram showing a moving picture expert group-2 (MPEG-2) video encoder with a motion detecting function used as a remotely monitored image data processing device according to an embodiment of the present invention.

FIG. 4 is, a diagram showing a moving picture expert group-2 (MPEG-2) video encoder with a motion detecting function used as a remotely monitored image data processing device according to an embodiment of the present invention.

Referring to FIG. 4, the video input signals 400 inputted from the cameras is multiplexed from at least one channel to four or more channels, and inputted to an MPEG-2 video encoder 401 as a single video input signal 400 or on a separate basis. The MPEG-2 video encoder 401 having a motion detecting function encodes and compresses the video signals while monitoring motions at the a same time so as to output an MPEG-2 bit stream 402, which are compressed image data, and the motion detection signals 403 corresponding to each channel.

Figure 5:
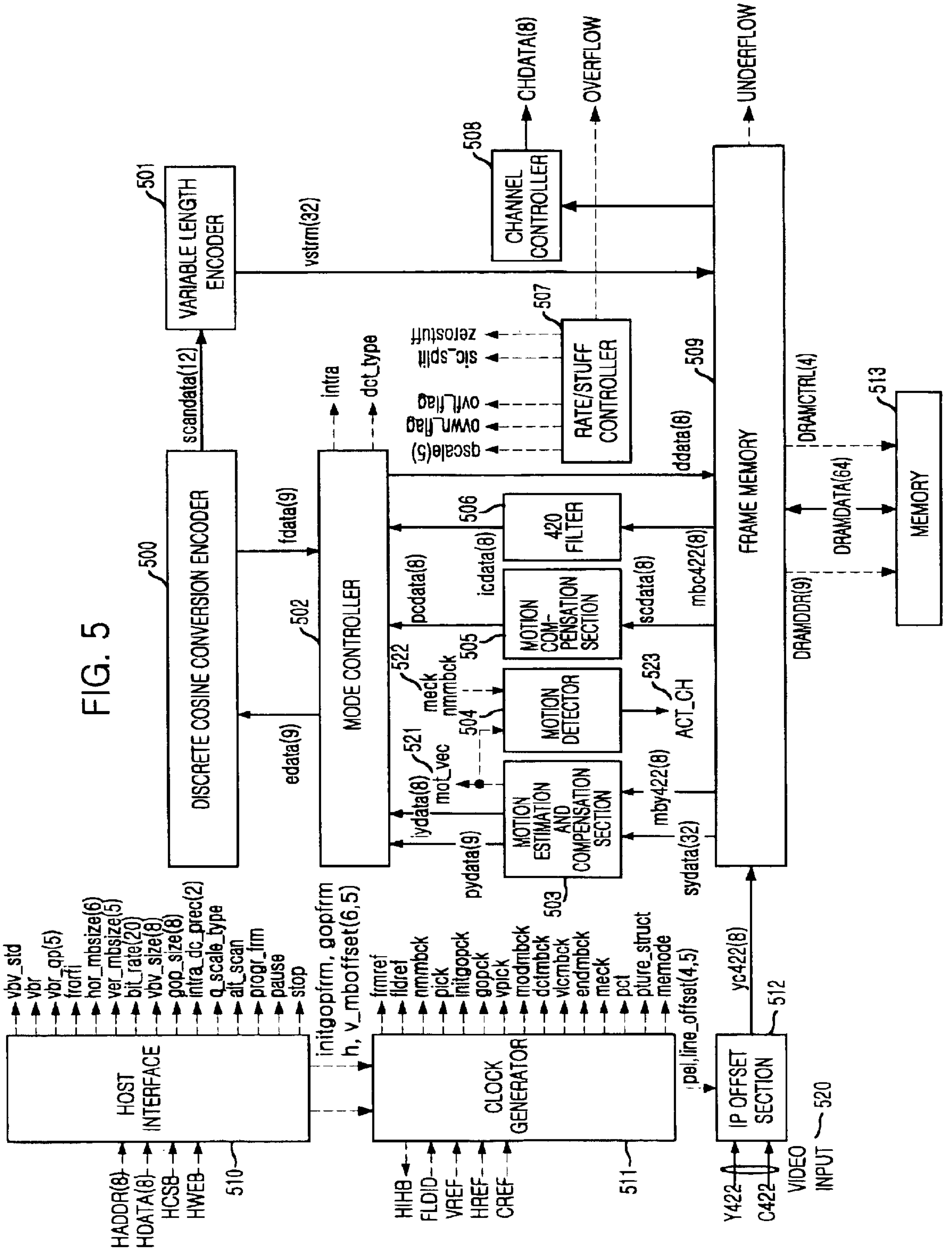
FIG. 5 is a block diagram showing a detailed construction of the MPEG-2 video encoder with a motion detecting function in FIG. 4.

FIG. 5 is a block diagram showing a detailed construction of the MPEG-2 video encoder with a motion detecting function in FIG. 4.

Referring to FIG. 5, the MPEG-2 encoder according to the present invention comprises: an IP offset section 512 for comparing video inputs 520; a frame memory 509 for storing the IP-offset data; a memory 513 for storing data necessary for the MPEG-2 encoder; a motion estimation and compensation section (ME/MC) 503 for removing chronological redundancy; a clock generator 511 for generating diverse clocks used in the MPEG-2 video encoder; a motion detector for detecting motions by receiving a clock 522 outputted from the ME/MC section 503 and the clock generator 511; a mode controller 502 for controlling data signals necessary for MPEG-2 video encoder; a discrete cosine conversion encoder 500 for removing special redundancy of images; a variable length encoder 501 for encoding the data generated by the discrete cosine conversion encoder 500 in a variable length;, a host interface 510 for receiving data signals, address signals, etc., and outputting the signals necessary for the MPEG-2 video encoder; a motion compensation section; (MC) 505 for compensating for motions; a 420 filter 506 for filtering data; a rate/stuff controller 507 for controlling rate and stuff necessary for the MPEG-2 video encoder; and a channel controller 508 for controlling the channel of the MPEG-2 video encoder.

All of the above constitutional elements have been well known in the pertinent art except the motion detector 504. Thus, no detailed description will be made here in connection thereto.

The following is a description of a process of detecting motions by the MPEG-2 video encoder with a motion detecting function.

The ME/MC 503 compresses an image by searching the image most similar to the inputted image or encoding a current image frame from the previous frame, and by extracting locational information, i.e., a motion vector (mot_vec) 521. The mot_vec 521 is inputted to the motion vector 504. The motion detector 504 receives the clock for motion estimation and compensation and the mot_vec 521, and outputs a motion detection signal (ACT_CH) 523 if any motion is detected. This means that, the mot_vec 521 has a "0" value if no motion is detected from the inputted image, but that the mot_vec 521 will have a value greater than "0" if any motion is detected from the inputted image, thereby obtaining information on a motion. The motion detector 50 obtains the locational information of a macro block currently being encoded, and detects on which part of the current screen the motion exists.

Figure 6:
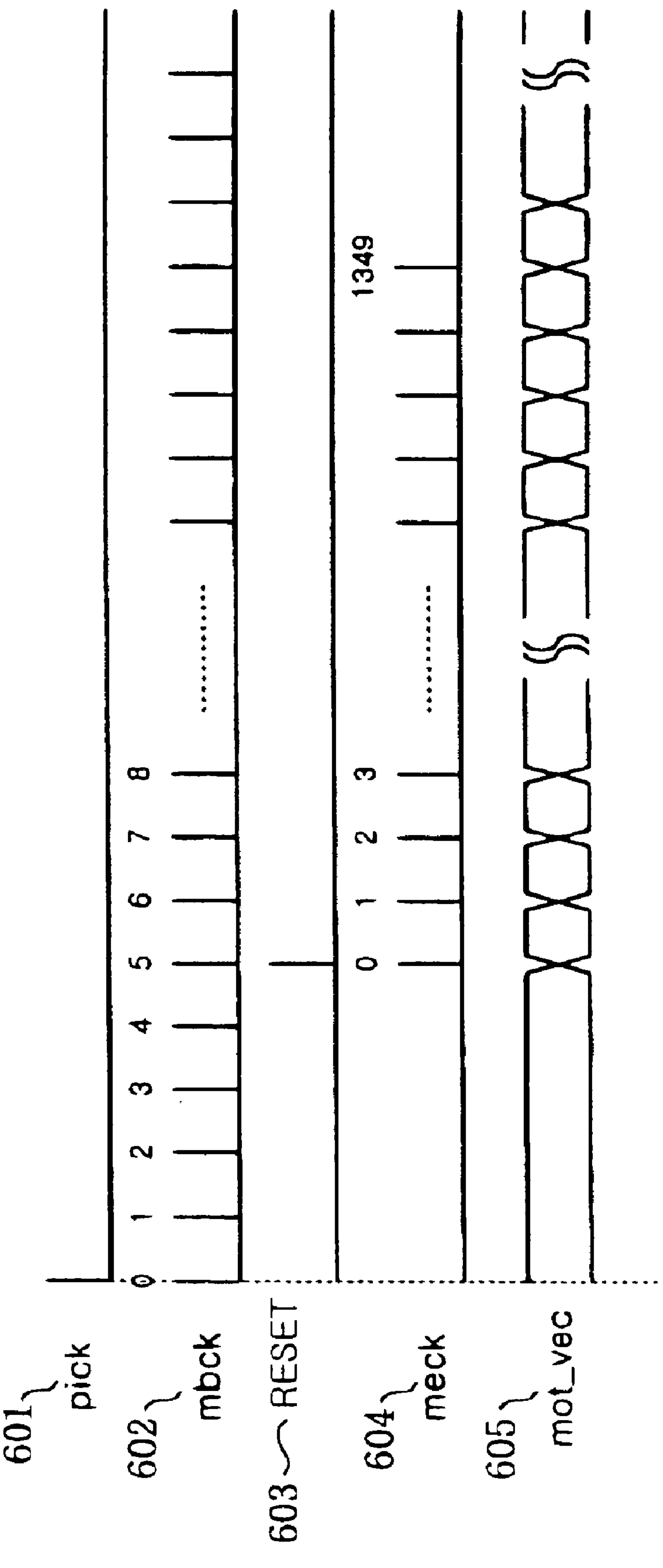
FIG. 6 is a timing diagram showing an output of information on motions according to a embodiment of the present invention.

FIG. 6 is a timing diagram showing an output of information on motions according to an embodiment of the present invention.

Referring to FIG. 6, the used by the motion detector according to the present invention are a picture clock (pick) 601 and a macro block clock (mbck) 602 constituting the pick 601. In particular, the mbck 602 is a clock used for a motion estimation and compensation clock (meck) 604 to maintain an outputting point of time and synchronization of the mot_vec 521 in the ME/MC 503. A reset signal 603 is a signal to reset a counter used by the motion detector. Assume that the mot_vec 605 outputted from the ME/MC 503 is effective at least during 256 clocks (27 MHz) from the meck 604. For reference, the effective data are composed of 1350 macro blocks (16×16) corresponding to 45×30 per picture when an image of the National Television System Committee (NTSC) format (720×480) is inputted.

Figure 7:
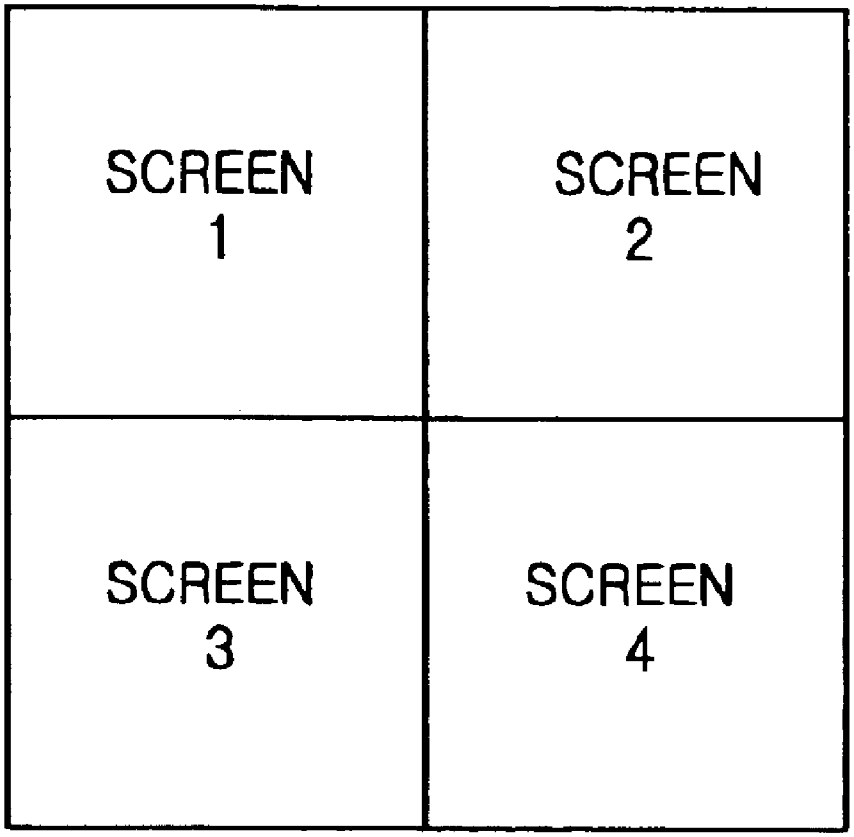
FIG. 7 is a block diagram showing a construction of a screen of video input signals multiplexed according to the present invention.

FIG. 7 is a block diagram showing construction of a screen of video input signals multiplexed according to the present invention.

FIG. 7 is a construction of a screen when data from four channels at the maximum are multiplexed through a single input line.

The construction of a screen becomes the same as that in FIG. 7 when extracting a location of a macro block, from which a motion has been detected based on the motion timing as shown in FIG. 6. If a single channel is used, entire screen is occupied. For a single channel sized ¼ of the NTSC, display can be made in the middle of a screen by using an offset function.

Figure 8:
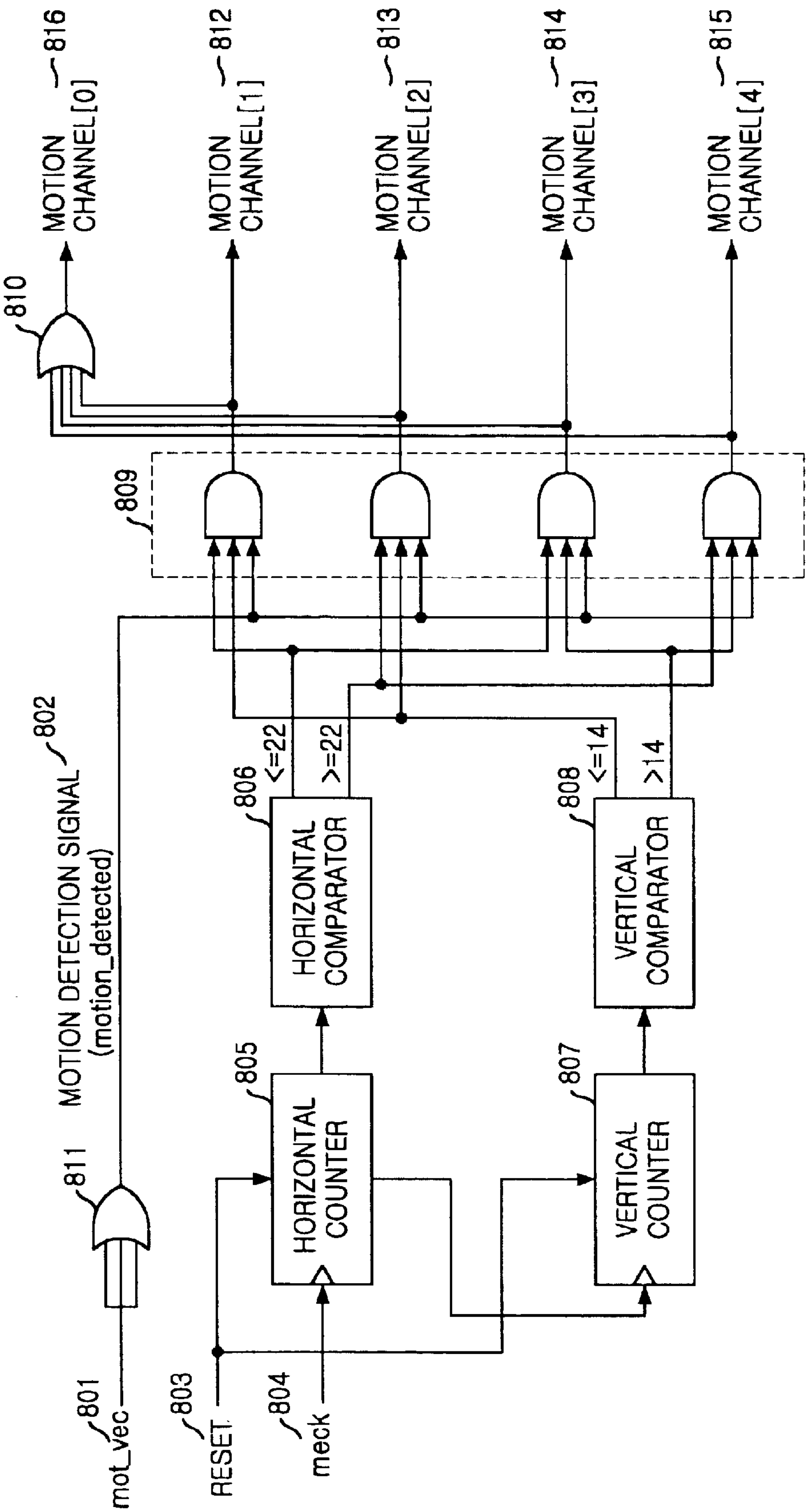
FIG. 8 is a block diagram showing a detailed construction of all motion detection section according to the present invention.

FIG. 8 is a block diagram showing a detailed construction of a motion detection section according to the present invention.

Referring to FIG. 8, the motion detector 504 includes: a horizontal counter 805 and a horizontal comparator 806 for obtaining a horizontal location within one macro block; a vertical counter 807 and a vertical comparator 808 for obtaining a vertical location within one macro block; a first OR gate 811 for detecting a motion by using a motion vector value 801 outputted from the ME/MC 503, and outputting a motion detection signal (motion_detected) 802; an AND processor 809 for performing an AND for signals outputted from the horizontal counter 805 and the horizontal comparator 806, signals outputted from the vertical counter 807 and the vertical comparator 808, and a motion detection signal outputted from the first OR gate 811; and a second OR gate 810 for performing an OR for each signal outputted from the AND processor 809 to detect motions in the entire channels.

The following is a description of an operation of the motion detector according to the present invention constructed as above.

An input of the motion vector value 801 greater than "0" means that a motion has been detected. Therefore, the motion_detected 802 is inputted to the AND processor 809. At that time, the coefficients calculated by the horizontal counter 805 and the vertical counter 807 are compared by the horizontal comparator 806 and the vertical comparator 808 to determine the location where the motion has been detected. To be specific, the location of the macro block where the motion has been detected is determined by dividing the entire screen into four. In other words, of the total macro blocks numbering 45×30, the left portion of the screen represents the $0^{th}$–$21^{st}$ macro blocks in a horizontal direction, while the right portion of the screen represents the $23^{rd}$–$44^{th}$ macro blocks in the horizontal direction. The $22^{nd}$ macro block occupies the middle of the left and the right portions of the screen. The upper portion of the screen represents the $0^{th}$–$14^{th}$ macro blocks in a vertical direction, while the lower portion of the screen, represents the $15^{th}$–$29^{th}$ macro blocks in the vertical direction.

Accordingly, the horizontal location of a motion can be detected in the left portion, in the right portion or in the middle of the screen by determining the coefficients with the horizontal counter 805 and by comparing the coefficients with the horizontal comparator 806. The vertical location of a motion can also be detected in the upper or lower portion of the screen by determining the coefficients with the vertical counter 807 and by comparing the coefficients with the vertical comparator 808. Since the signal that has detected the horizontal and vertical locations and the motion detected 802 are mutually in AND 809, the motion of the screen corresponding to each channel can be independently detected and outputted according to the result of the AND 809.

Also, the screen or the channel, the motion of which has been detected as shown in FIG. 8, outputs a warning signal of a motion channel [1] 812 when the motion has been detected from the ¼ divided portion of th screen, of a motion channel [2] 813 when the motion has been detected from the 2/4 divided portion of the screen, of a motion channel [3] 814 when the motion has been detected from the ¾ divided portion of the screen, and of a motion channel [4] 815 when the motion has been detected from the 4/4 divided potion of screen. All the signals outputted from the OR processor 809 are inputted to the second OR gate 810. Therefore, a warning signal is outputted from the motion channel [0] 816 if any motion is detected from any channel.

As described above, the present invention provides an effect of performing a remote monitoring in real time by compression-encoding a plurality of monitored image data or audio data in a bit stream, generating a motion detection signal for each image data, and by compressing/transmitting video or video/audio data with an ADS modem installed in a reverse direction.

The present invention provides another effect of drastically reducing the recording time by a storing device of the receiving party because the motion detection signals are generated and transmitted on a separate basis.

The present invention further provides an advantage of realizing a remote monitoring system with a low cost without installing an additional device when the system is constructed by using a computer of the receiving party having an MPEG-2 decoding function.

Although the preferred embodiments of the invention have been disclosed for illustrative purpose, those skilled in the art will be appreciate that various modifications, additions and substitutions are possible, without departing from the scope and spirit of the invention as disclosed in the accompanying claims.

What is claimed is:

1. A real time remote monitoring system using an ADSL modem in a reverse direction, comprising:

monitoring means for monitoring an object facility to be monitored;

remotely monitored data processing means for monitoring motions according to each channel with respect to the monitored data obtained by the monitoring means so as to be compression-encoded and transmitted in a bit stream, and generating detection signals with respect to the monitored data that have been detected;

first ADSL modulating/demodulating means installed in a reverse direction for modulating the data inputted from the remotely monitored data processing means so as to be upwardly transmitted to a network in a transmission velocity higher than that of a downward channel, and demodulating the data transferred from the network in a transmission velocity lower than that of an upward channel so as to be transferred to the remotely monitored data processing means;

second ADSL modulating/demodulating means installed in a reverse direction for demodulating the data transferred from the first ADSL modulating/demodulating means in a transmission velocity higher than that of the downward channel so as to be transferred to a receiving party, and modulating the data transferred from the receiving party so as to downwardly transferred to the first ADSL modulating/demodulating means in a transmission velocity lower than that of the upward channel.

2. The real time remote monitoring system as recited in claim 1, further comprising telephone modulating/demodulating means connected to the object facility to be monitored and the first ADSL modulating/demodulating means for modulating/demodulating transaction data transmitted/received between the object facility to be monitored and a device of the receiving party.

3. The real time remote monitoring system as recited in claim 2, wherein the transaction data is transmitted/received between the object facility and the device of the receiving party through either one of the upward/downward channels.

4. The real time remote monitoring system of claim 1, wherein either one of the upward/downward channels is used as an exclusive Internet line, and the other channel as a monitoring channel.

5. The real time remote monitoring system as recited in claim 1, further comprising warning means for warning illegal users of the object facility under a control from the receiving party by using either one of the upward/downward channels as a control channel.

6. The real time remote monitoring system as recited in claim 5, wherein the monitoring means includes a plurality of monitoring cameras for obtaining monitored image data by photographing the object facility to be monitored.

7. The real time remote monitoring system as recited in claim 6, wherein the monitoring means further includes a microphone for obtaining monitored audio data with respect to surroundings of the object facility to be monitored.

8. The real time remote monitoring system as recited in claim 5, wherein the remotely monitored data processing means includes:

storing means for storing inputted video data;

motion estimation and compensation means for removing chronological redundancy;

clock generating means for generating diverse clocks;

motion detecting means for detecting motions by receiving a motion vector outputted from the motion estimation and compensation means and the clock generating means; and controlling and encoding means for controlling and encoding the video data.

9. The real time remote monitoring system as recited in claim 8, wherein the monition detecting means detects motions by using the motion vector size outputted from the motion estimation and compensation means, and detects location of motions by using locational information on macro blocks.

10. The real time remote monitoring system as recited in claim 8, wherein the motion detecting means includes:

a motion detecting section for detecting motions by using the motion vector size outputted from the motion estimation and compensation means, and outputting a motion detection signal;

a horizontal location detecting section for obtaining a horizontal location within one macro block;

a vertical location detecting section for obtaining a vertical location within one macro block;

a first detecting section for detecting motions in each channel on a separate basis by performing an AND for signals outputted from the motion detecting section, the horizontal location detecting section and the vertical location detecting section; and a second detecting section for detecting motions in the entire channels by performing an OR for each signal outputted from the first detecting section.

11. A real time remote monitoring method comprising the steps of:

a) obtaining monitored data by monitoring an object facility to be monitored;

b) detecting motions according to each channel with respect to the monitored data that have been obtained, compression-encoding the monitored data in a bit stream so as to be transmitted, and generating detection signals with respect to each of the monitored data that has been detected; and c) modulating the monitored data and the detection signals with an ADSL modem installed in a reverse direction in an upward transmission velocity higher than that of a downward channel so as to be transmitted to a network, and demodulating the data transferred from the network in a downward transmission velocity lower than that of an upward channel so as to perform a remote monitoring.

12. The real time remote monitoring method as recited in claim 11, wherein the motion detection in the step b) includes the steps of:

b1) obtaining a motion vector size outputted from a motion estimation and compensation section;

b2) confirming whether or not the obtained motion vector size is greater than a predetermined critical value;

b3) obtaining a horizontal location of the motion by comparing counter coefficients of a horizontal counter, and obtaining a vertical location of the motion by comparing counter coefficients of a vertical counter; and b4) detecting existence of a motion in each channel on a separate basis, and outputting a result thereof.

* * * * *